US011911884B2

(12) United States Patent
Ou

(10) Patent No.: US 11,911,884 B2
(45) Date of Patent: Feb. 27, 2024

(54) NAIL GUN

(71) Applicant: PANREX INDUSTRIAL CO., LTD., Taichung (TW)

(72) Inventor: Chen-Ho Ou, Taichung (TW)

(73) Assignee: PANREX INDUSTRIAL CO., LTD., Taichung (TW)

( * ) Notice: Subject to any disclaimer, the term of this patent is extended or adjusted under 35 U.S.C. 154(b) by 104 days.

(21) Appl. No.: 17/743,206

(22) Filed: May 12, 2022

(65) Prior Publication Data

US 2022/0371165 A1 Nov. 24, 2022

(30) Foreign Application Priority Data

May 19, 2021 (TW) ................................. 110118130

(51) Int. Cl.
*B25C 1/00* (2006.01)

(52) U.S. Cl.
CPC .............. *B25C 1/008* (2013.01); *B25C 1/003* (2013.01)

(58) Field of Classification Search
CPC ........................................................ B25C 1/00
See application file for complete search history.

(56) References Cited

U.S. PATENT DOCUMENTS

| | | | | |
|---|---|---|---|---|
| 5,667,127 A * | 9/1997 | Ichikawa | B25C 1/008 | 227/8 |
| 2010/0193560 A1* | 8/2010 | Liang | B25C 1/044 | 227/5 |
| 2010/0258607 A1* | 10/2010 | Lam | B25C 1/008 | 227/8 |
| 2017/0120432 A1* | 5/2017 | Brendel | B25C 1/06 | |
| 2018/0229354 A1* | 8/2018 | Reed | B25C 7/00 | |

* cited by examiner

*Primary Examiner* — Praachi M Pathak
(74) *Attorney, Agent, or Firm* — DLA PIPER LLP (US)

(57) ABSTRACT

A nail gun includes a nail gun body unit, and a magazine unit. The nail gun body unit has a drive module, a nail-discharging section, and a firing channel that is formed in the nail-discharging section, and that extends along a firing axis. The nail-discharging section has a base segment, and a guide segment having a guide surface. The base segment has a tip section that has a tip face. The tip face and the guide surface have a height difference in the direction of the firing axis. The magazine unit is connected to the nail gun body unit, and is adapted to accommodate nails. The drive module is adapted for firing the nails that are positioned within the firing channel to move along the firing axis.

6 Claims, 4 Drawing Sheets

NAIL GUN

CROSS-REFERENCE TO RELATED APPLICATION

This application claims priority to Taiwanese Invention Patent Application No. 110118130, filed on May 19, 2021.

FIELD

The disclosure relates to a nail gun, and more particularly to a nail gun that is stable during use.

BACKGROUND

A conventional nail gun includes a nail gun unit, and a magazine unit connected to the nail gun unit. The nail gun unit includes a muzzle section, and a firing channel formed in the muzzle section. The magazine unit accommodates a plurality of nails and dispenses the nails to the firing channel successively. When using the conventional nail gun, the muzzle section is brought to abut against a workpiece, and then the nail gun unit can be operated to fire the nail in the firing channel into the workpiece.

However, because the conventional nail gun generates significant recoil when the nail is fired, the muzzle section may slide during the recoil and the fired nail may enter the workpiece at a distorted angle. This is especially problematic when the material of the workpiece is a hard material, or when the coefficient of friction of the workpiece is small (such as metal) which is easier for the nail gun to slide relative to the workpiece when the nail gun is firing.

Furthermore, when the nail is fired into a counterbore of the workpiece, if the diameter of the muzzle section is larger than the aperture of the major hole of the counterbore, the muzzle section cannot extend into the major hole of the counterbore and the nail gun may slide even more when fired due to the recoil.

SUMMARY

Therefore, the object of the disclosure is to provide a nail gun that can alleviate at least one of the drawbacks of the prior art.

According to the disclosure, the nail gun is adapted to successively fire a plurality of nails, and includes a nail gun body unit and a magazine unit. The nail gun body unit has a drive module, a nail-discharging section that is adapted for abutting against a workpiece, and a firing channel that is formed in the nail-discharging section, and that extends along a firing axis. The nail-discharging section has a base segment, and a guide segment partially surrounding the base segment. The guide segment has a tip section that protrudes from the guide segment in a direction of the firing axis, and that has a tip face extending in a direction perpendicular to the firing axis. The guide segment has a guide surface that extends in the same direction as the tip face. The tip face and the guide surface has a height difference in the direction of the firing axis. The magazine unit is connected to the nail gun body unit, and is adapted to accommodate the nails and to successively dispense the nails into the firing channel. The drive module is adapted for firing the nails that are positioned within the firing channel to move along the firing axis.

BRIEF DESCRIPTION OF THE DRAWINGS

Other features and advantages of the disclosure will become apparent in the following detailed description of the embodiment(s) with reference to the accompanying drawings, of which.

DETAILED DESCRIPTION

Figure 1:
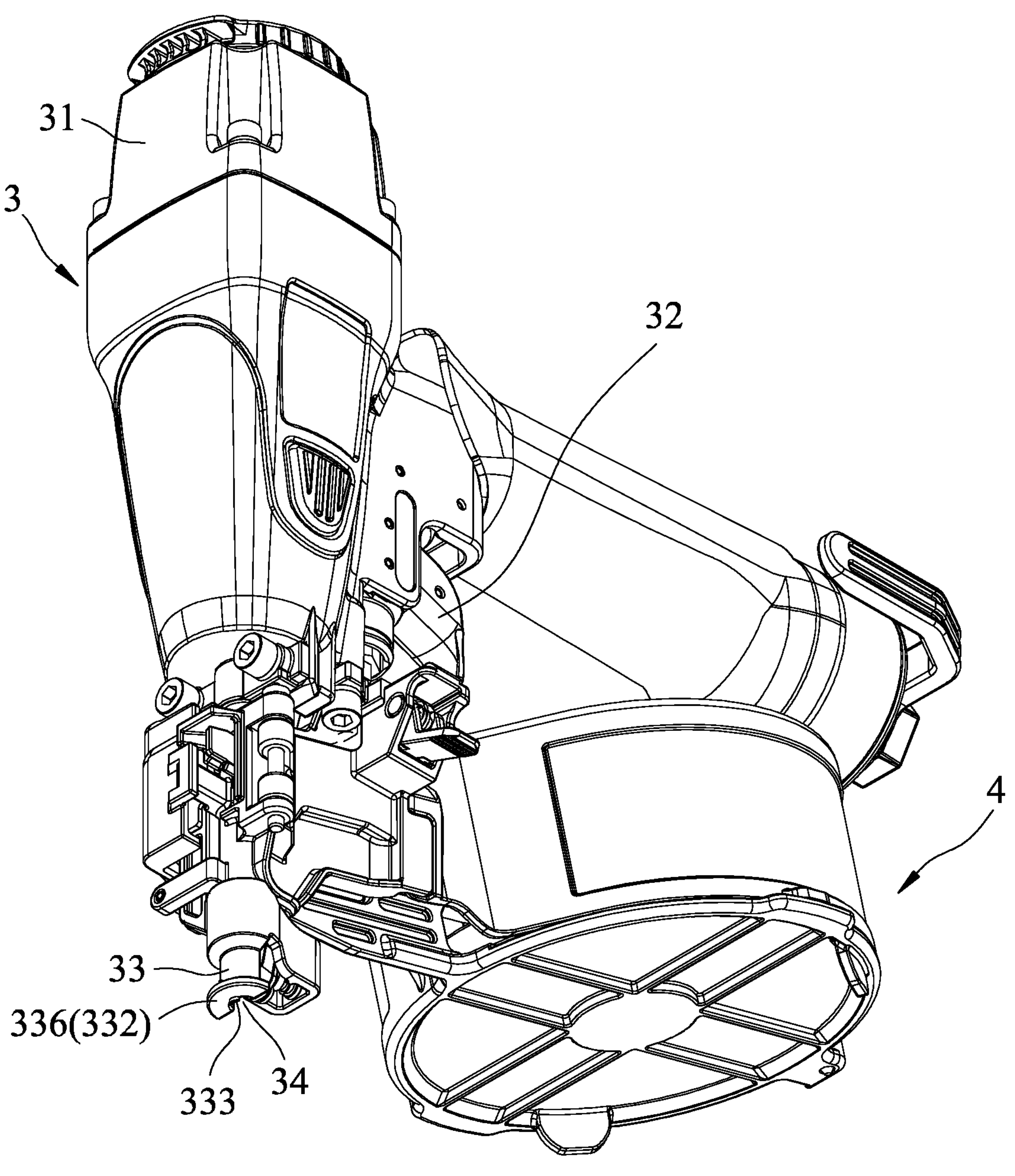
FIG. 1 is a perspective view of a nail gun according to an embodiment of the present invention.
Figure 2:
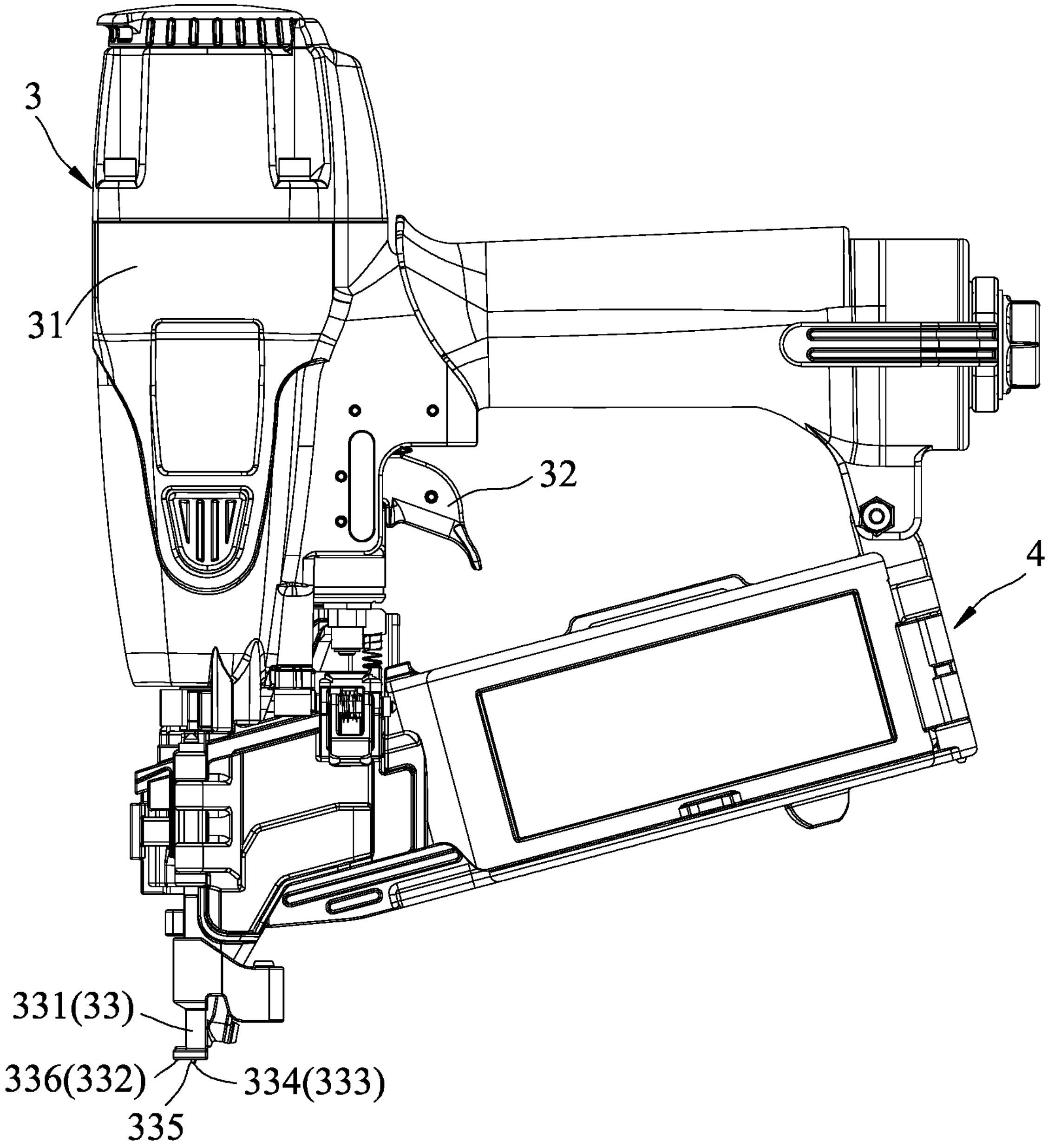
FIG. 2 is a side view of the embodiment.
Figure 3:
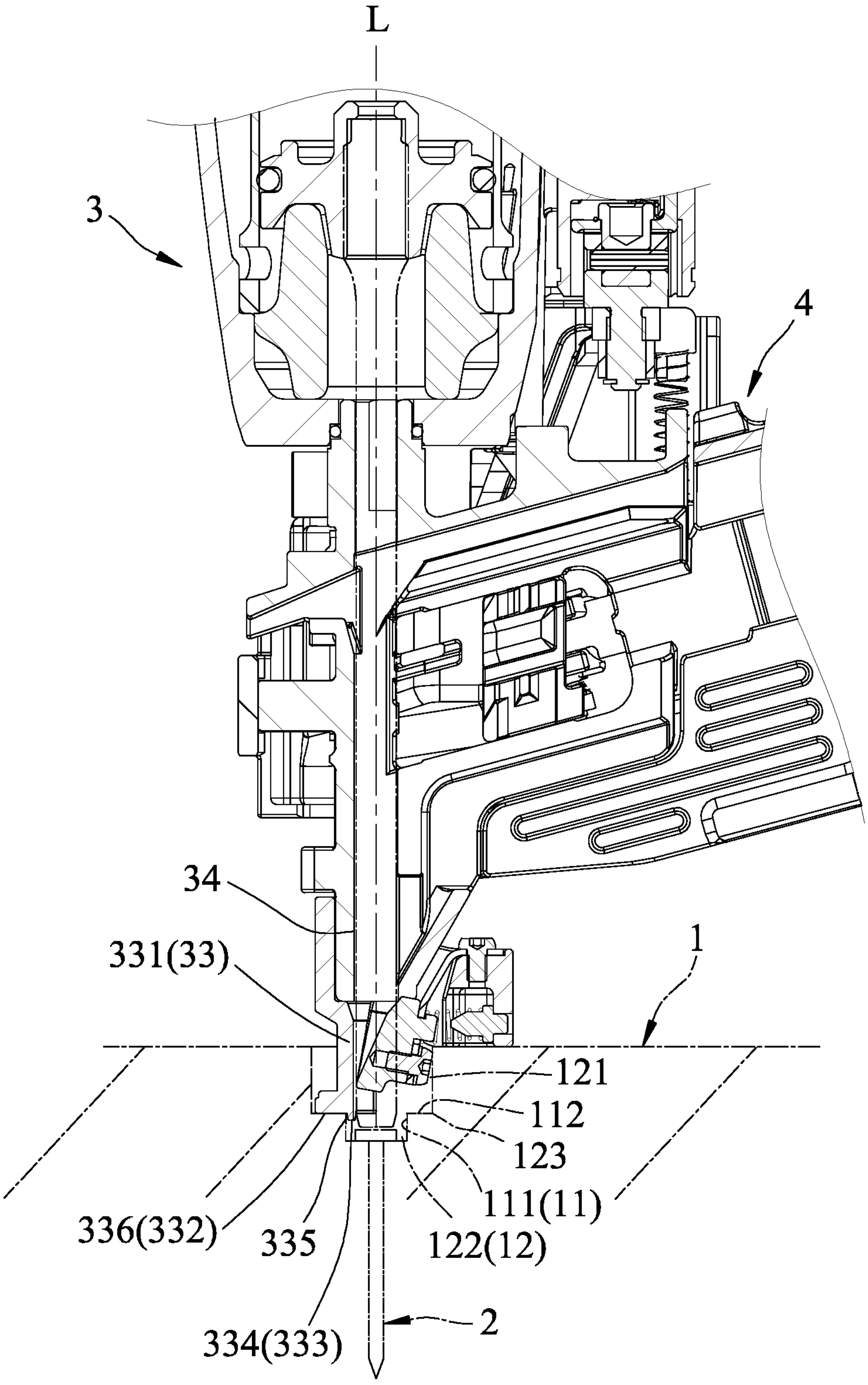
FIG. 3 is a fragmentary schematic sectional view, illustrating the embodiment used on a workpiece.
Figure 4:
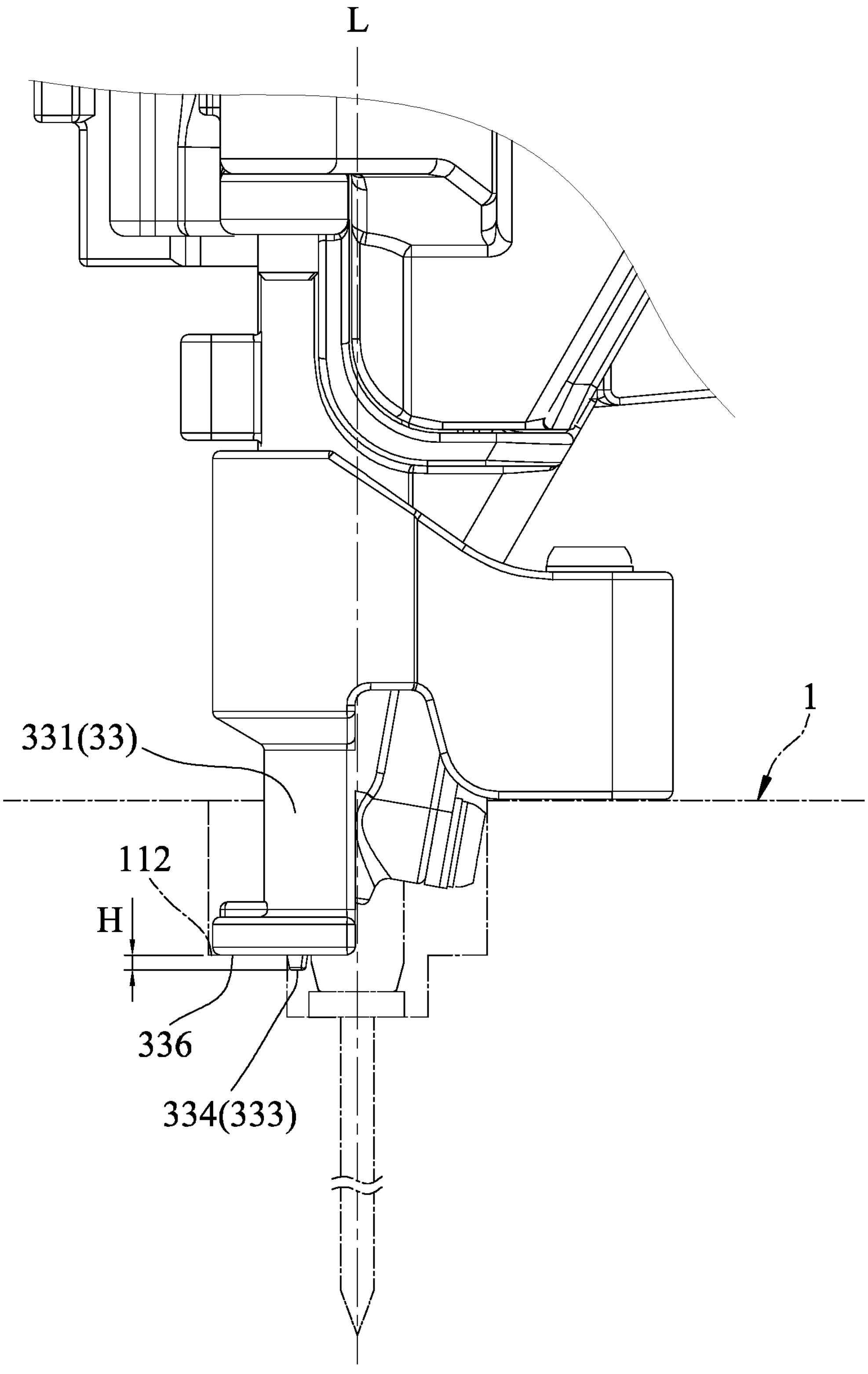
FIG. 4 is a fragmentary schematic view illustrating a height difference formed between a tip surface and a guide surface of the embodiment.

Referring to FIGS. 1 to 4, an embodiment of a nail gun according to the present disclosure is shown. The nail gun is adapted to successively fire a plurality of nails 2 (only one of the nails 2 is shown in FIGS. 3 and 4).

In this embodiment, the workpiece 1 includes a main body 11 that has a counterbore 12. The counterbore 12 has a large diameter section 121, a small diameter section 122 that is under the large diameter section 121 and that has a diameter smaller than that of the large diameter section 121, and an intermediate section 123 communicating between the large diameter section 121 and the small diameter section 122. The main body 11 has a lower counterbore side surface 111 that surrounds and that defines the small diameter section 122, and a counterbore medial surface 112 that surrounds the intermediate section 123 and that is connected transversely to the lower counterbore side surface 111.

The nail gun includes a nail gun body unit 3, and a magazine unit 4.

The nail gun body unit 3 has a drive module 31, an activation unit 32 that is operable by a user for activating the drive module 31, a nail-discharging section 33 that is for abutting against the workpiece 1, and a firing channel 34 that is formed in the nail-discharging section 33, and that extends along a firing axis (L). The nail-discharging section 33 has a base segment 331 and a guide segment 332 at least partially surrounding the base segment 331. The base segment 331 has a tip section 333 that protrudes from the guide segment 332 in a direction of the firing axis (L). The tip section 333 has a tip face 334 extending in a direction perpendicular to the firing axis (L), and a channel side surface 335 extending upwardly from the tip face 334 and that is connected to the guide segment 332. The guide segment 332 has a guide surface 336 that extends in the same direction as the tip face 334, and that is parallel to the tip face 334. The tip face 334 and the guide surface 336 has a height difference (H) in the direction of the firing axis (L).

In this embodiment, the guide segment 332 of the nail gun body unit 3 partially surrounds the base segment 331. The guide surface 336 of the nail gun body unit 3 is semi-annular, and the tip face 334 has a curved shape. The guide surface 336 has an area larger than that of the tip face 334, and the height difference (H) between the tip face 334 and the guide surface 336 in the direction of the firing axis (L) is smaller than 1 centimeter.

The magazine unit 4 is connected to the nail gun body unit 3, and is adapted to accommodate the nails 2. In this embodiment the magazine unit 4 is a drum magazine that is adapted for accommodating collated nails (not shown), but is not limited thereto.

The magazine unit 4 is adapted to successively dispense the nails 2 into the firing channel 34. The drive module 31 is adapted for firing the nails 2 that are positioned within the firing channel 34 to move along the firing axis (L).

When the user uses the nail gun, the guide surface 336 is brought to abut against the counterbore medial surface 112 of the workpiece 1. Then, the activation unit 32 is operated to activate the drive module 31 such that the drive module 31 fires the nail 2 within the firing channel 34, and the nail 2 can be nailed to the workpiece 1. Since the guide surface 336 is semi-annular, it has a certain abutment area so as to allow the nail-discharging section 33 to abut stably against the workpiece 1 and prevent sliding movement when the nail gun is in use.

It is worth mentioning that, by virtue of the height difference (H) between the tip face 334 and the guide surface 336 in the direction of the firing axis (L), when the guide surface 336 abuts against the counterbore medial surface 112 of the workpiece 1, the tip section 333 will extend into the small diameter section 122 of the counterbore 12. At this time, the user can bring the channel side surface 335 of the tip section 333 to be in contact with the lower counterbore side surface 111 of the workpiece 1 as desired. As such, the nail-discharging section 33 can be more stably abut against the workpiece 1, so that the nail-discharging section 33 does not slide easily relative to the workpiece 1 when the nail is fired.

Additionally, it should be noted that, in other embodiments, the workpiece 1 may not include the counterbore 12, or the workpiece 1 may instead include a blind hole (not shown). Since the nail gun with the tip face 334 and the guide surface 336 are not easy to slide, at least one of the tip face 334 and the guide surface 336 can abut against the workpiece 1. Furthermore, because the guide surface 336 is semi-annular and the tip face 334 is curved, the guide surface 336 and the tip face 334 can both have a certain amount of area to abut against the workpiece 1 to provide greater friction compared to the conventional nail gun mentioned in the prior art so as to prevent sliding movement during use.

In summary, the nail gun according to the present disclosure does not slide easily because of the tip face 334 and the guide surface 336. Since the height difference (H) is formed between the tip face 334 and the guide surface 336 along the direction of the firing axis (L), at least one of the tip face 334 and the guide surface 336 can abut against the workpiece 1. As such, the nail-discharging section 33 does not slide easily relative to the workpiece 1, and the object of this invention can be achieved.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A nail gun adapted to successively fire a plurality of nails, said nail gun comprising:
- a nail gun body unit having
  - a drive module,
  - a nail-discharging section that is adapted for abutting against a workpiece, and
  - a firing channel that is formed in said nail-discharging section, and that extends along a firing axis,
  - wherein said nail-discharging section has a base segment and a guide segment at least partially surrounding said base segment, said base segment having a tip section that protrudes from said guide segment in a direction of the firing axis, and that has a tip face extending in a direction perpendicular to the firing axis, said guide segment having a guide surface that extends in the same direction as said tip face, said tip face and said guide surface having a height difference in the direction of the firing axis; and
- a magazine unit connected to said nail gun body unit, and adapted to accommodate the nails and to successively dispense the nails into said firing channel, said drive module being adapted for firing the nails that are positioned within the firing channel to move along the firing axis.

2. The nail gun as claimed in claim 1, wherein said guide segment of said nail gun body unit partially surrounds said base segment, and said guide surface is semi-annular.

3. The nail gun as claimed in claim 1, wherein said tip face of said nail gun body unit has a curved shape.

4. The nail gun as claimed in claim 1, wherein said guide surface of said nail gun body unit has an area larger than that of said tip face.

5. The nail gun as claimed in claim 1, wherein said guide surface is parallel to said tip face.

6. The nail gun as claimed in claim 1, wherein the height difference (H) between said tip face and said guide surface is smaller than 1 centimeter.

* * * * *